United States Patent
Noda

(10) Patent No.: US 7,353,902 B2
(45) Date of Patent: Apr. 8, 2008

(54) AIR CLEANER BOX FOR STRADDLE VEHICLE

(75) Inventor: Masahiro Noda, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 308 days.

(21) Appl. No.: 11/234,070

(22) Filed: Sep. 23, 2005

(65) Prior Publication Data

US 2006/0065456 A1   Mar. 30, 2006

(30) Foreign Application Priority Data

Sep. 24, 2004   (JP)   ............... 2004-277463

(51) Int. Cl.
*F02M 35/02* (2006.01)
*B62K 11/00* (2006.01)
(52) U.S. Cl. .................... 180/219; 123/198 E
(58) Field of Classification Search ........... 180/218, 180/219; 123/198 E
See application file for complete search history.

(56) References Cited

U.S. PATENT DOCUMENTS

| | | | | |
|---|---|---|---|---|
| 4,169,512 A | * | 10/1979 | Ishikawa et al. ........... | 180/205 |
| 5,609,658 A | * | 3/1997 | Takemura et al. ......... | 55/385.3 |
| 6,422,201 B1 | * | 7/2002 | Yamada et al. ............ | 123/336 |
| 6,425,451 B2 | * | 7/2002 | Yoshida et al. ............ | 180/219 |
| 6,601,667 B2 | * | 8/2003 | Buell et al. ................. | 180/229 |
| 6,688,274 B2 | * | 2/2004 | Yokoyama et al. ..... | 123/198 E |
| 7,198,128 B2 | * | 4/2007 | Buell et al. ................. | 180/219 |
| 2002/0023795 A1 | * | 2/2002 | Nagai ......................... | 180/219 |

FOREIGN PATENT DOCUMENTS

JP        08-067285        3/1996

* cited by examiner

*Primary Examiner*—Tony Winner
(74) *Attorney, Agent, or Firm*—Hogan & Hartson LLP

(57) ABSTRACT

A straddle vehicle having an under bone frame structure in which a portion positioned in front of a seat is recessed downward. An air cleaner is disposed behind a cylinder block of an engine to be interposed between a right and a left seat rail. An upper portion of the air cleaner projects upward more than the seat rails. A top of the air cleaner is covered by a seat front cover that divides a space defined in front of the seat. The air cleaner includes a lid and a cleaner case that is more tall than is broad. For maintenance work, the seat front cover is removed, and the lid is taken out obliquely upward forward.

10 Claims, 7 Drawing Sheets

AIR CLEANER BOX FOR STRADDLE VEHICLE

BACKGROUND OF THE INVENTION

1. Field of the Invention

This invention relates to a straddle type vehicle such as a motorcycle, for example.

2. Description of Related Art

Conventionally, in straddle type vehicles such as motorcycles etc., the so-called under bone type frame structure is known. In a straddle type vehicle having the under bone type frame structure, an area existing in front of a seat is greatly recessed downward to define a relatively large space in the front area of the seat. Thus, according to the under bone type vehicle, a rider can easily get on and off the vehicle. On the other hand, however, in the under bone type vehicle, vehicle components need to be efficiently disposed under the seat to define such a large space in front of the seat.

Patent Document 1 discloses an under bone type motorcycle. The motorcycle includes a main frame obliquely extending downward rearward from a head pipe, and seat rail frames obliquely extending upward rearward from a rear portion of the main frame. The main frame supports an engine under a suspended condition. A fuel tank is mounted on the seat rail frames, and a seat is disposed above the fuel tank. A carburetor is disposed in the rear of the engine, and an air cleaner is disposed in the rear of the carburetor. The air cleaner is positioned below the fuel tank. A rear portion of the air cleaner and a front portion of the fuel tank together align vertically. Also, the air cleaner are placed between the right and left seat rail frames. A top end of the air cleaner is generally positioned at the same height as the seat rail frames.

[Patent Document 1] JP-A-Hei08-67285, laid-open patent application publication.

By the way, the air cleaner needs periodical maintenance. For example, a filter of the air cleaner should be periodically cleaned or replaced with new one. In the motorcycle, the air cleaner is disposed below the fuel tank. Maintenance work thus is made by an approach from a lateral side location.

However, a user is compelled to take a stooping position or a squatting position for making replacement work, for example, of the filter, because the air cleaner is placed at a relatively low position. Therefore, some of the users can be uncomfortable in the maintenance work of the air cleaner.

SUMMARY OF THE INVENTION

This invention is made under the circumstances, and an object thereof is to make maintenance work of an air cleaner easier in a straddle type vehicle having the under bone type frame structure.

A straddle type vehicle according to the present invention is directed to a vehicle comprising a vehicle body frame including a head pipe, a front frame connected to the head pipe and obliquely extending downward rearward, and a rear frame connected to the front frame and obliquely extending upward rearward, at least one of the front frame and the rear frame having a pair of spaced portions spaced apart in a transverse direction of the vehicle. The vehicle included an engine having a crankcase and a cylinder block extending forward (including a horizontally forward direction and an obliquely forward upward direction) therefrom. The engine is supported by the vehicle frame. The vehicle includes an air cleaner positioned behind the cylinder block and between the spaced portions in the transverse direction, a seat supported by the rear frame, and a seat front cover that is detachably positioned below and ahead of the seat and has a concave, in a side elevational view, to define a top open space in front of the seat for covering a top of the air cleaner, wherein a portion or the whole of the air cleaner is mounted to be insertable and removable by an approach from an upper location or an obliquely front upper location.

According to the straddle type vehicle, a space located above the air cleaner becomes open when the seat front cover is removed. Thus, a portion or the whole of the air cleaner can be taken out upward or obliquely upward forward. Also, under the removed condition of the seat front cover, the portion or the whole of the air cleaner can be inserted by the approach from the upper location or the obliquely front upper location. The maintenance work for the air cleaner thus can be made by the approach from the upper location or the obliquely front upper location. Accordingly, the user can make the maintenance work in a comfortable position, even though the air cleaner is placed at the relatively low position.

Preferably, the air cleaner has a box shape such that a length thereof in a vertical direction is longer than any one of a length thereof in a fore to aft direction and a length thereof in the transverse direction.

A capacity of the air cleaner can be therefore larger without increasing a length of the vehicle in the fore to aft direction or a width thereof (a length in the transverse direction). Additionally, because the air cleaner can be inserted and removed by the approach from an upper location or an obliquely front upper location, unlike any work made by an inserting or removing approach from a lateral side location, the attaching and detaching work does not become difficult even though the air cleaner elongates vertically.

Preferably, the air cleaner is supported in a forward slanting position.

An apparent length of the air cleaner in the vertical direction can be therefore shorter corresponding to the forward slant of the air cleaner. Thus, the seat positioned above the air cleaner can be placed at a relatively low position. Also, because of the forward slant, an upper portion of the air cleaner inevitably extends toward the space located in front of the seat. Therefore, the portion or the whole of the air cleaner can be inserted from the space located in front of the seat without being disturbed by the seat. Also, the portion or the whole of the air cleaner can be taken out to the space located in front of the seat without being disturbed by the seat. The attaching and detaching work of the air cleaner becomes easier, accordingly.

By the way, in the vehicle which maintenance work for its air cleaner is made by the approach from the lateral side location, such as the motorcycle disclosed in Patent Document 1, a space for the maintenance work is required at the lateral side location of the air cleaner. In order to ensure the space for the maintenance work at the lateral side location, the motorcycle disclosed in Patent Document 1 has a front end of each seat rail frame positioned generally at the same height as a top end of the air cleaner. Accordingly, the front ends of the respective seat rail frames are placed at a relatively high position. However, the front ends of the respective seat rail frames are portions that project broadly in the transverse direction. If the front ends of the respective seat rail frames are positioned higher as discussed, the broadly spaced portions are inevitably positioned higher. This condition can be one of factors that hinder the vehicle from being slimmer.

Therefore, preferably, the air cleaner is positioned between the spaced portions of the vehicle body frame, and an upper portion of the cleaner projects upward more than the spaced portions.

Thus, the vehicle body frame can be positioned lower than the top end of the air cleaner. As a result, the vehicle becomes slimmer (the width of the vehicle becomes narrower).

Preferably, the air cleaner includes an air cleaner upper portion that is positioned higher than the spaced portions of the vehicle body frame, and an air cleaner lower portion that is positioned lower than the spaced portions, and a width of the air cleaner upper portion is larger than that of the air cleaner lower portion.

In this way, the handling of the air cleaner upper portion can be easier, the insertion and removal of the air cleaner by the approach from the upper location or the obliquely front upper location can be easier. The maintenance work for the air cleaner thus can be easier.

Preferably, the width of the air cleaner upper portion is smaller than a distance between a right end of the spaced portion on a right hand side of the vehicle body frame and a left end of the spaced portion on a left hand side of the vehicle body frame.

In this way, the air cleaner does not protrude beyond the vehicle body frame in the transverse direction. The vehicle can be slimmer, accordingly.

Preferably, the air cleaner includes a box-like cleaner case a top of which opens, and a lid detachably attached to the cleaner case to block the opening.

In this way, the lid can be attached or detached by the approach from the upper location or the obliquely front upper location. Thus, the maintenance work of the air cleaner can be easily performed.

Preferably, meeting surfaces of the lid and the cleaner case incline to descend forward.

In this way, the lid can be attached or detached by the approach from the upper location or the obliquely front upper location. The maintenance work for the air cleaner can be therefore easier.

Preferably, the meeting surfaces of the lid and the cleaner case extend generally parallel to the rear frame.

The rear frame scarcely disturbs the lid to be attached or detached. The maintenance work for the air cleaner can be therefore easier.

Preferably, the air cleaner has a filter element built-in that is positioned higher than the spaced portions of the vehicle body frame.

In this way, the filter element is placed at a relatively high position. The filter element can be easily cleaned or replaced with new one by the approach from the upper location or the obliquely front upper location, after the lid is removed. Also, because the filter element and the spaced portions do not overlap with each other in the transverse direction, the distance between the spaced portions does not become larger even though a width of the filter element is large. The vehicle can be slimmer, accordingly.

As described above, in accordance with the present invention, the maintenance work for the air cleaner can be made by the approach from the upper location or the obliquely front upper location only by removing the seat front cover. Thus, the user can make the maintenance work in a comfortable position, and the maintenance work for the air cleaner can be easier, accordingly.

Also, if the air cleaner and the vehicle body frame are disposed in such a manner that the upper portion of the air cleaner projects upward more than the spaced portions of the vehicle body frame, then the vehicle can be slimmer.

DETAILED DESCRIPTION OF THE INVENTION

Hereunder, an embodiment of the present invention is described in detail, referring to the accompanying drawings.

Figure 1:
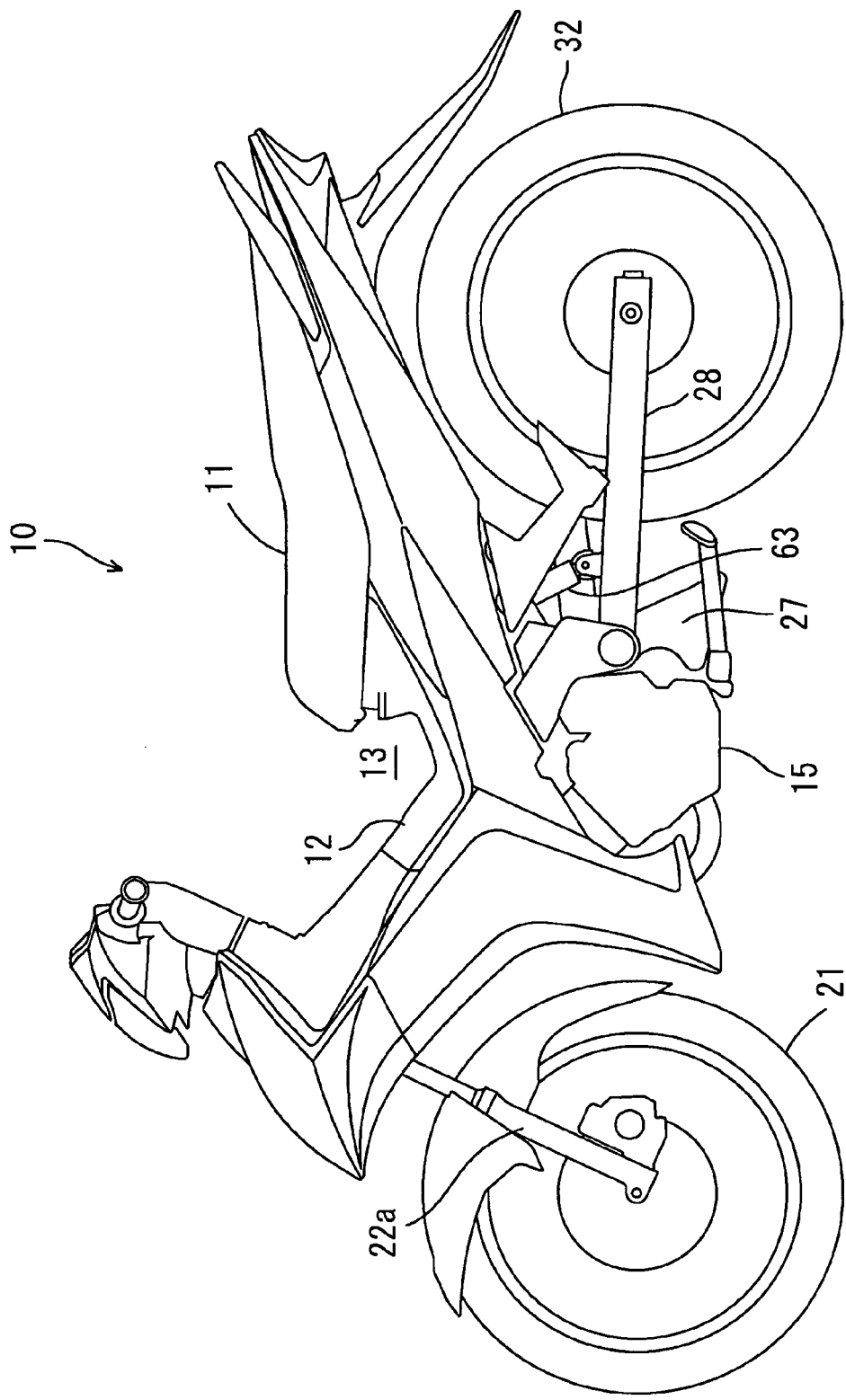
FIG. 1 is a side elevational view of a motorcycle according to an embodiment.

As shown in FIG. 1, a straddle type vehicle according to an embodiment is a motorcycle 10 having an under bone type frame structure. A detachable seat front cover 12 is attached below and ahead of a seat 11. The seat front cover 12 curves or bends to be a generally concave shape as seen in a side elevational view. The seat front cover 12 defines a space 13 that is recessed downward in front of the seat 11.

Figure 2:
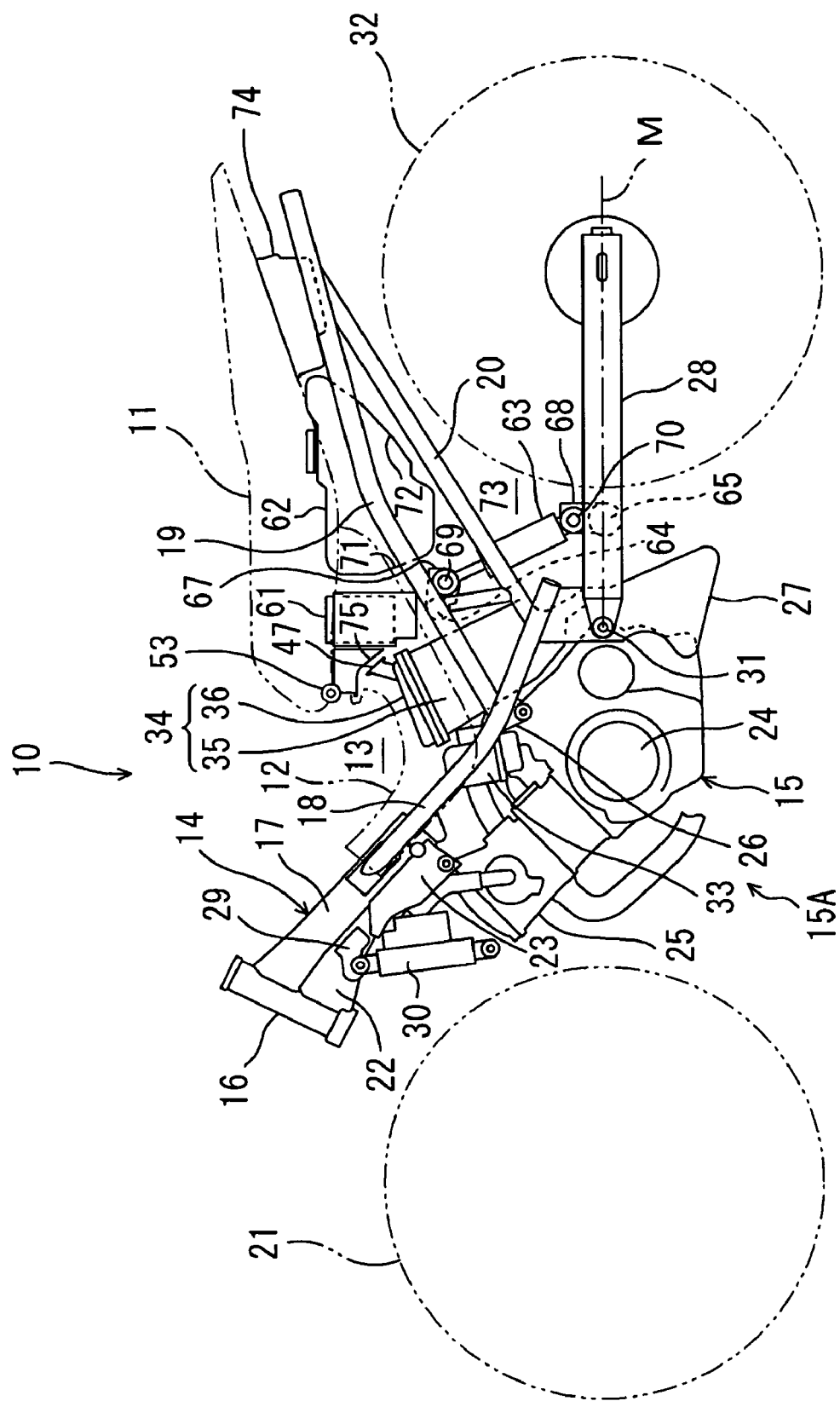
FIG. 2 is a side elevational view, showing an internal structure of the motorcycle.

As shown in FIG. 2, the motorcycle 10 has a vehicle body frame 14, and an engine 15 supported by the vehicle body frame 14 under a suspended condition. The vehicle body frame 14 and the engine 15 together form a vehicle body 15A. The engine 15 includes a crankcase 24 and a cylinder block 25 obliquely extending upward forward from the crankcase 24. The vehicle body frame 14 includes a head pipe 16, a single main frame 17, a pair of a right and a left sub frame 18, a pair of a right and a left seat rail 19 and a pair of a right and a left backstay 20.

A steering shaft, which is not shown, passes through the head pipe 16. A lower portion of the steering shaft has a front fork 22a (see FIG. 1). A lower end of the front fork 22a supports a front wheel 21 for rotation.

The main frame 17 is connected to a rear surface of the head pipe 16 and obliquely extends downward rearward. The main frame 17 is rectangular and hollow in cross section. However, the main frame 17 may have any other shapes. A gusset 22 is affixed to a front half area of a bottom surface of the main frame 17. The gusset 22 extends between the bottom surface of the main frame 17 and the rear surface of the head pipe 16.

The sub frames 18 are affixed to respective right and left side surfaces of the main frame 17. Each sub frame 18 has a diameter smaller than that of the main frame 17. A cross sectional area of each sub frame 18 is smaller than that of the main frame 17. The major part of each sub frame 18 has a circular pipe shape in cross section. However, a flat plate shape replaces the circular shape of a front end of each sub frame 18 toward the front end. The flat plate shaped portion of the front end of each sub frame 18 is joined with the respective side surface of the main frame 17 by welding or the like under a condition that a surface of the flat plate shaped portion abuts on the side surface of the main frame 17. Thus, the pair of the right and left sub frame 18 are connected to the respective side surfaces of the main frame 17.

Each sub frame 18 bends in such a manner that its center portion in its longitudinal direction extends convexly downward. A front portion (a portion ahead of the bending portion) of each sub frame 18 extends generally parallel to an axial direction of the cylinder block 25 of the engine 15. A rear portion of each sub frame 18 has a slope that is gentler than that of the front portion. As discussed, the sub frames 18 are shaped and disposed along the engine 15.

Each seat rail 19 is joined with the vicinity of the bending portion of the respective sub frame 18 by welding or the like. Thereby, each seat rail 19 obliquely extends upward rearward from the vicinity of the bending portion of each sub frame 18. Each seat rail 19 bends in such a manner that its center portion in its longitudinal direction extends convexly upward. Each seat rail 19 is made from a circular pipe.

Each backstay 20 is joined with a rear end of the respective sub frame 18 by welding or the like. Therefore, each backstay 20 obliquely extends upward rearward from the rear end of the sub frame 18. A rear end of each backstay 20 is joined with a rear end of the respective seat rail 19 by welding or the like. Similarly to the seat rail 19, each backstay 20 is made from a circular pipe.

The sub frames 18, seat rails 19 and backstays 20 together form a pair of a right and a left side frame. Additionally, the sub frames 18, the seat rails 19 and the backstays 20 may have any shapes other than the circular pipe shape. The vehicle body frame 14 may be made of iron, aluminum or other materials.

A bracket 23 is affixed to the bottom surface of a rear end of the main frame 17. The cylinder block 25 of the engine 15 is attached to the bracket 23 via bolts and nuts. Brackets 26 are affixed to the vicinity of the bending portions of the respective sub frames 18. The crankcase 24 of the engine 15 is attached to the brackets 26 via bolts and nuts. Another bracket 27 is affixed to respective rear ends of the sub frames 18. The bracket 27 supports both the crankcase 24 of the engine 15 and rear arms 28. As discussed, the engine 15 is supported by the main frame 17 and the sub frames 18 under the suspended condition.

A front end of each rear arm 28 is supported by the bracket 27 for swinging about an axis of a pivot shaft 31. A rear end of each rear arm 28 supports a rear wheel 32 for rotation. Additionally, in this embodiment, the vehicle body frame 14 supports the rear arms 28 via the bracket 27. However, a portion of the engine 15 may supports the rear arms 28.

A radiator 30 is disposed ahead of and above the cylinder block 25 of the engine 15 and below the main frame 17. A bracket 29 is affixed to the gusset 22 that is affixed to the bottom surface of the main frame 17. The bracket 29 supports the radiator 30.

A carburetor 33 is disposed above the crankcase 24 of the engine 15 and in the rear and the vicinity of the cylinder block 25. An air cleaner 34 is disposed behind the carburetor 33. The air cleaner 34 is interposed between right and left separated portions of the vehicle body frame 14. That is, the air cleaner 34 is placed between the sub frame 18 and the seat rail 19 on the right hand side and the sub frame 18 and the seat rail 19 on the left hand side.

The air cleaner 34 is positioned under the seat front cover 12. Specifically, the air cleaner 34 is positioned under a rear portion of the seat front cover 12 (a portion that descends forward; hereunder, called forward descending portion). Thus, the seat front cover 12 covers a top of the air cleaner 34.

Figure 6:
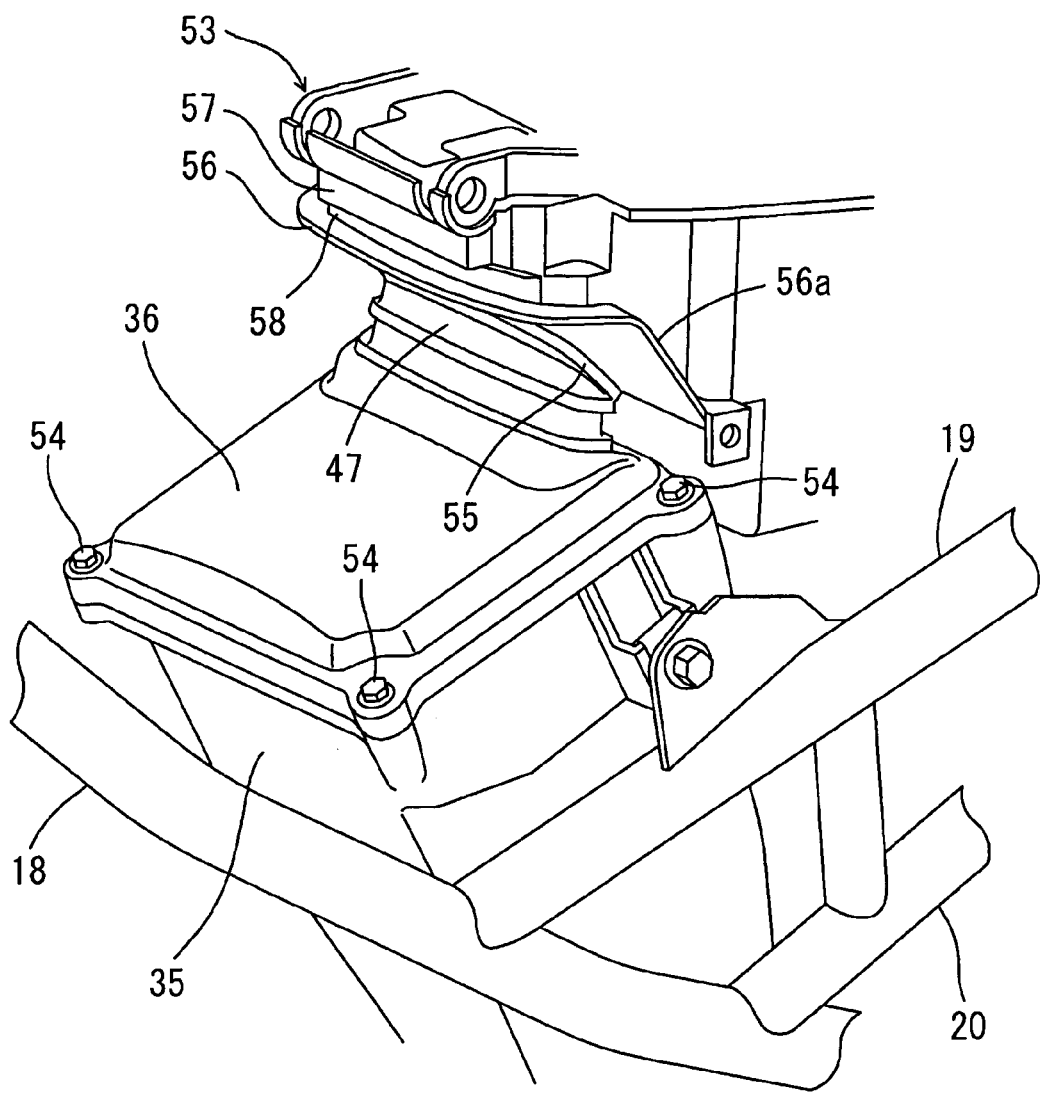
FIG. 6 is a perspective view of the air cleaner under the mounted condition.

The air cleaner 34 includes a cleaner case 35 and a lid 36. The cleaner case 35 has a box shape such that a length thereof in a vertical direction is longer than either a length thereof in a fore to aft direction or a length thereof in a transverse direction. A top of the cleaner case 35 has an opening, and the lid 36 covers and uncovers the opening. As shown in FIG. 6, the lid 36 and the cleaner case 35 are coupled together by bolts 54 positioned at four corners of the lid 36. Thus, the lid 36 can be easily attached to or detached from the cleaner case 35 by fastening or removing the bolts 54. Also, the air cleaner 34 slants forward so that a top surface of the air cleaner 34 inclines to descend forward. Thus, the concave shape of the seat front cover can be easily realized. A rider can easily get on and off the vehicle, accordingly, as described above.

Figure 3:
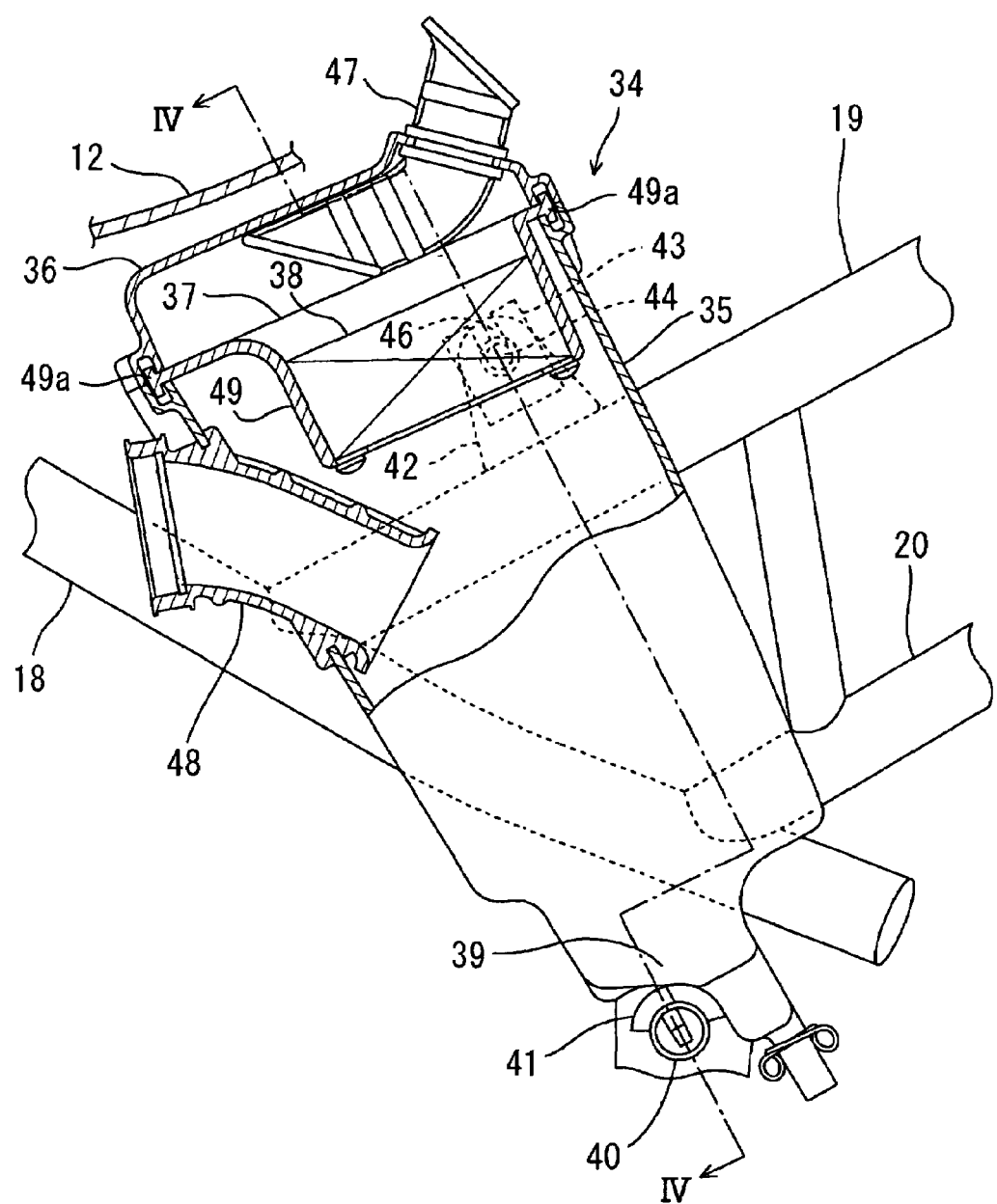
FIG. 3 is a partial cross sectional view of an air cleaner under a mounted condition thereof

As shown in FIG. 2, the air cleaner 34 is supported in a forward slanting position so that a top end is positioned ahead of a bottom end. As shown in FIG. 3, respective meeting surfaces of the lid 36 and the cleaner case 35 extend generally parallel to the seat rails 19 and slant to descend forward. Therefore, when the seat front cover 12 is removed and the lid 36 is detached obliquely upward forward, the lid 36 can be taken out from the cleaner case 35. To the contrary, when the lid 36 is putted onto the cleaner case 35 obliquely downward rearward under the condition that the seat front cover 12 is removed, the lid 36 can be attached to the cleaner case 35.

Figure 4:
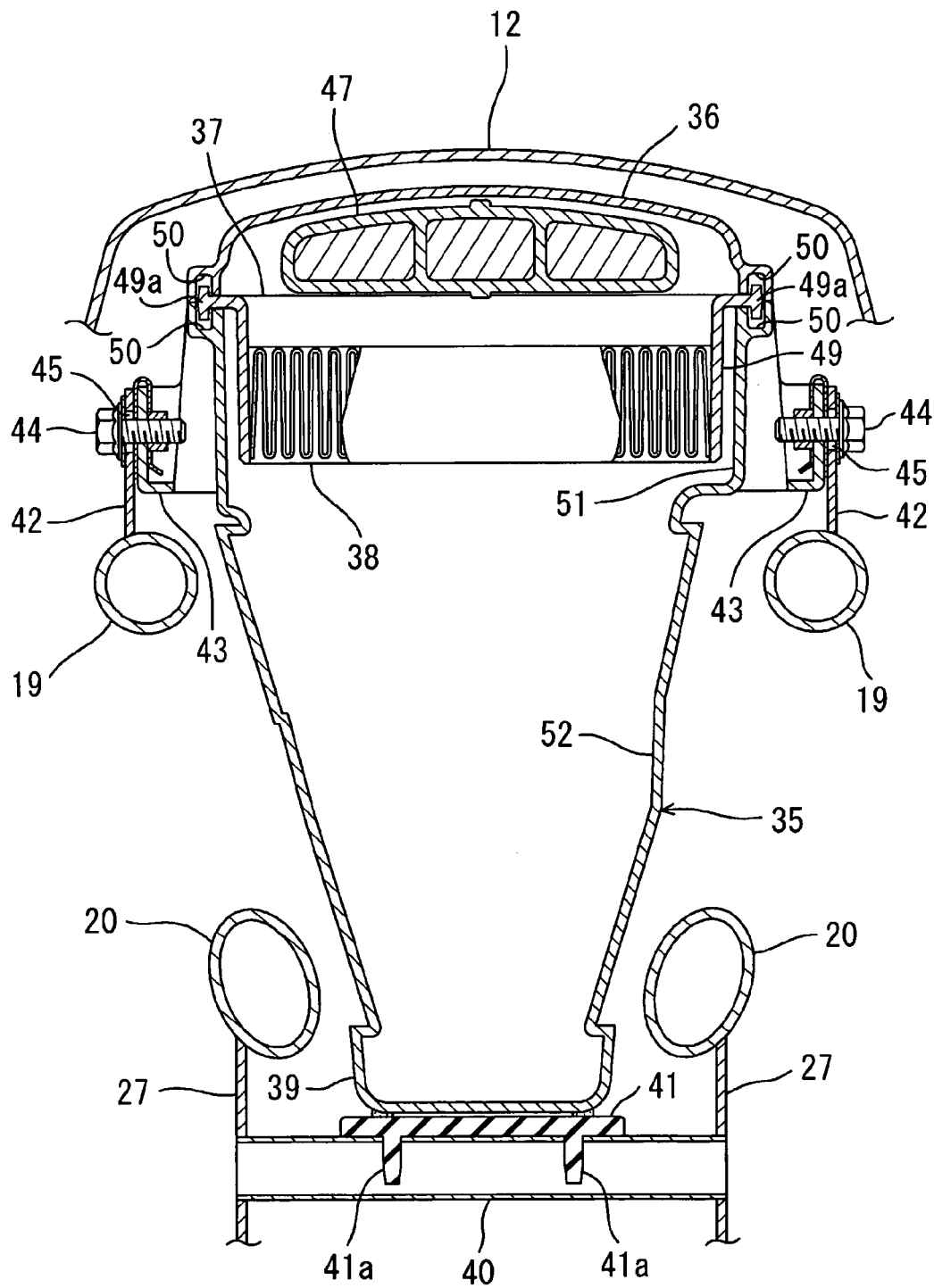
FIG. 4 is a cross sectional view, taken along the line IV-IV of FIG. 3.

As shown in FIG. 4, a cross pipe 40 extends between the right and left brackets 27. A lower portion of the cleaner case 35 is tapered downward and has a plurality of steps, including a step 39 (see FIG. 3). The step 39 of the cleaner case 35 is supported on the cross pipe 40 via a cushion rubber 41. Additionally, the cushion rubber 41 has a plurality of pins 41a extending downward. Those pins 41a are inserted into the cross pipe 40.

A bracket 42 having an aperture 45 is affixed to a top of each seat rail 19. Each upper portion of the respective right and left side surfaces of the cleaner case 35 has a sheet-like attachment 43 formed with a concave slit 46 (see FIG. 3) therein. Each bracket 42 and the respective attachment 43 are coupled together by a bolt 44 passing through the aperture 45 and the slit 46.

As discussed above, the cleaner case 35 is supported by the cross pipe 40 attached to the respective brackets 27 of the backstays 20 and by the respective brackets 42 of the right and left seat rails 19.

As shown in FIG. 4, a filter element 38 is enclosed in an upper space of the cleaner case 35. A holder 49 having a lying-T-shaped engaging portion 49a surrounds the girth of the filter element 38. A top end periphery of the cleaner case 35 has a groove 50 for receiving the engaging portion 49a of the holder 49. The engaging portion 49a engages with the groove 50 so that the cleaner case 35 detachably supports the holder 49. Additionally, a bottom end periphery of the lid 36 also has a groove 50 for receiving the engaging portion 49a of the holder 49.

The cleaner case 35 protrudes upward above the seat rails 19. Also, as described above, the cleaner case 35 is tapered downward. A width (breadth) of an air cleaner upper portion 51 positioned higher than the seat rails 19 is narrower than a width of an air cleaner lower portion 52 positioned lower than the seat rails 19. Further, the width of the air cleaner upper portion 51 is shorter than a length between a right end of the right hand side seat rail 19 and a left end of the left hand side seat rail 19. That is, the air cleaner 34 is formed not to extend beyond the right and left seat rails 19. The filter element 38 is placed in the air cleaner upper portion 51. The filter element 38 is therefore positioned higher than the seat rails 19.

As shown in FIG. 3, an intake pipe 47 extending obliquely upward rearward is inserted into a rear portion of the lid 36. The intake pipe 47 defines an air intake section of the air cleaner 34. One end of the intake pipe 47 has an air inlet port 47a (see FIG. 5) that opens obliquely upward rearward. Another end of the intake pipe 47 extends into the lid 36 and opens above the filter element 38. An air supply pipe 48 is inserted into the cleaner case 35 through a forward surface thereof to be connected to the carburetor 33 (not shown in FIG. 3, see FIG. 2). One end of the air supply pipe 48 opens at a location below the filter element 38 in the cleaner case 35. Additionally, the air supply pipe 48 opens obliquely downward at a generally center position in the vertical direction. Air taken through the intake pipe 47 passes through the filter element 38 and is supplied to the carburetor 33 through the air supply pipe 48.

As shown in FIG. 2, the intake pipe 47 of the air cleaner 34 is disposed within a space surrounded by the seat 11 and the forward descending portion of the seat front cover 12. The space above and behind the intake pipe 47 is partitioned from the external space by a wall surface 75.

Figure 5:
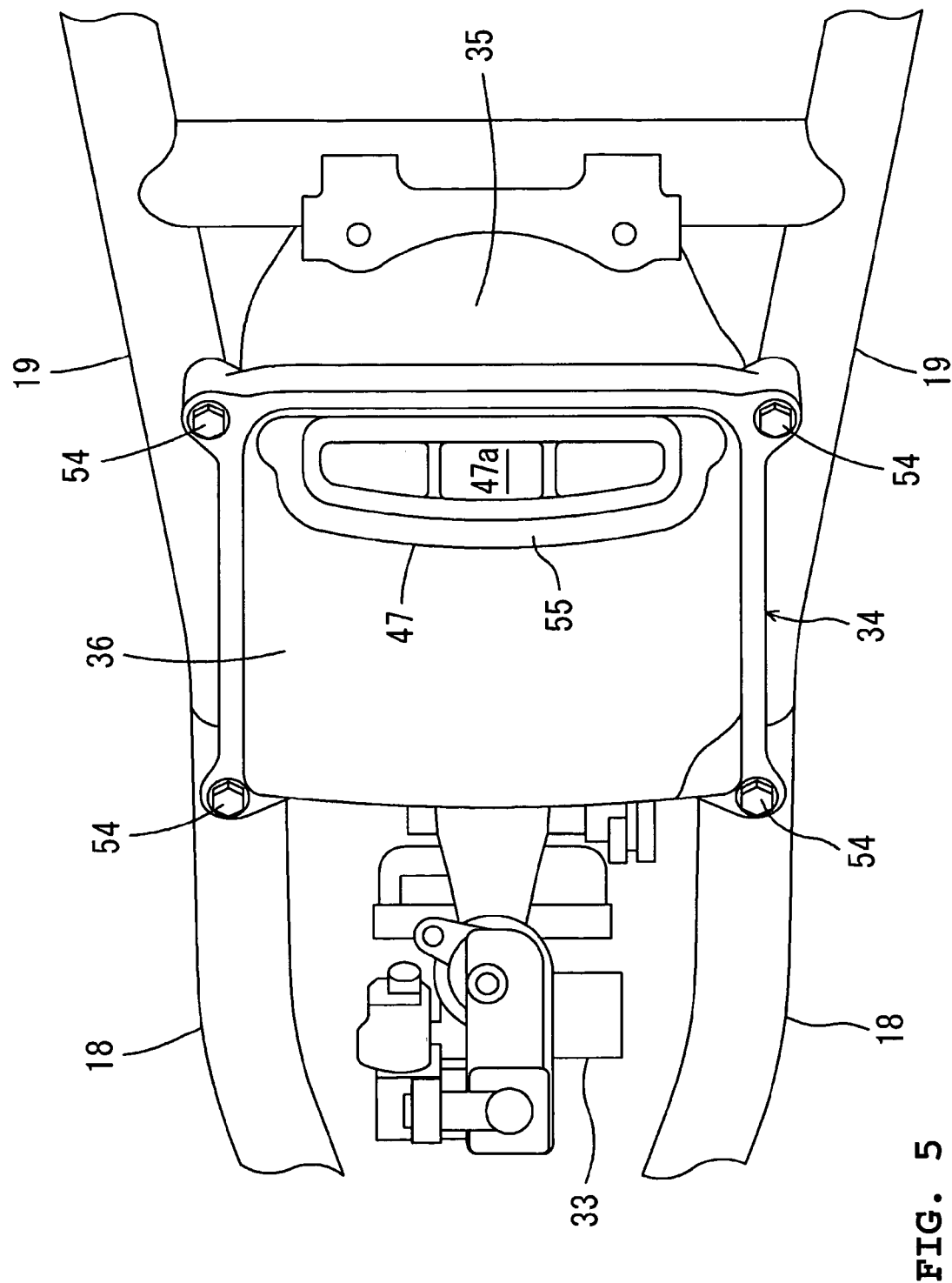
FIG. 5 is a top plan view of the air cleaner under the mounted condition.

As shown in FIG. 5, the intake pipe 47 is flat so as to be slender in the transverse direction. Therefore, a length of the intake pipe 47 in the fore to aft direction is short. The intake pipe 47 is directed to simply take the air existing behind a center portion of the air cleaner 34 in the fore to aft direction. On the other hand, the intake pipe 47 has a sufficient opening area, even though the length in the fore to aft direction is short, because the length of the intake pipe 47 in the transverse direction is long. The intake pipe 47 has a flange 55 extending outward and circumferentially around an opening end.

As shown in FIG. 2, a hinge mechanism 53 is provided at a lower portion of a front end of the seat 11. The seat 11 pivots about the front end as a fulcrum via the hinge mechanism 53 to open and close.

As shown in FIG. 6, the intake pipe 47 is positioned below the hinge mechanism 53. Below the hinge mechanism 53, a block 57 projects forward, and a flange 56 projects forward and sideward on both sides below the block 57. As a result, a recess 58 concaving rearward is defined between the block 57 and the flange 56. Both right and left side portions of the flange 56 slant obliquely downward rearward to form slant surfaces 56a.

Figure 7:
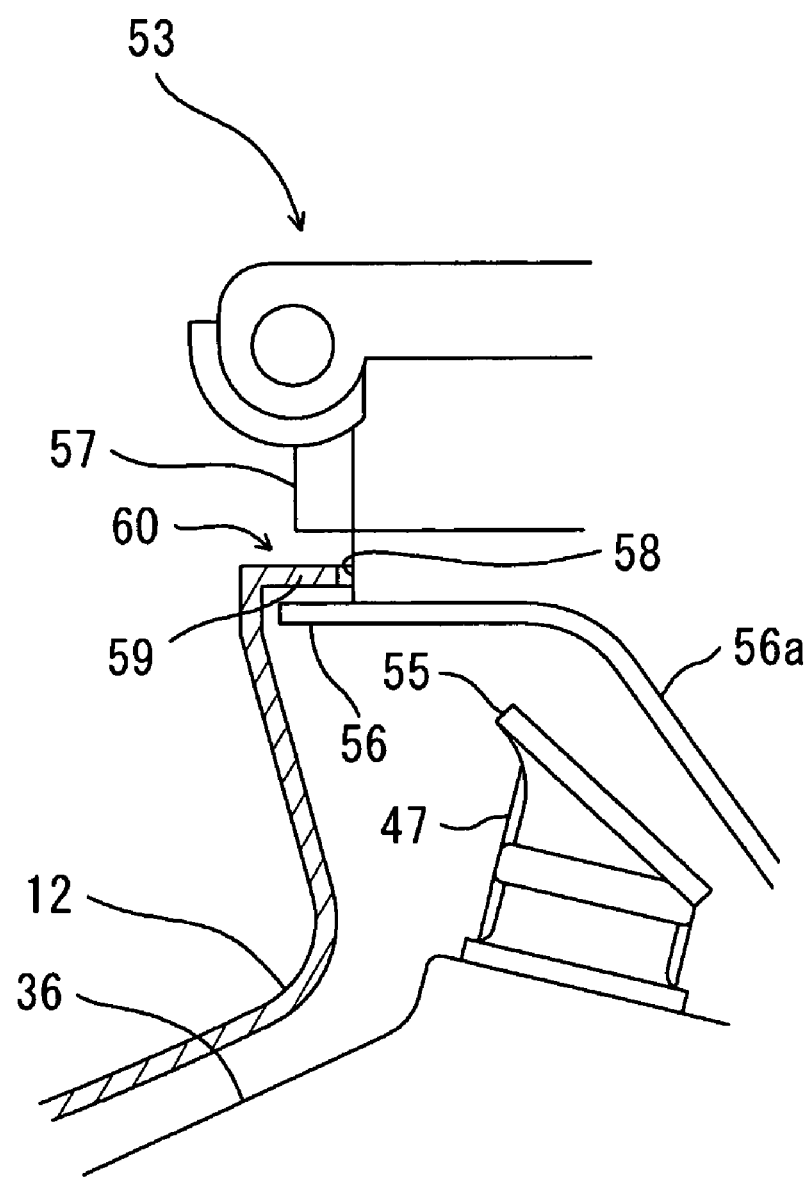
FIG. 7 is a cross sectional view of a labyrinth structure.

As shown in FIG. 7, the seat front cover 12 has a projection 59 extending rearward. The projection 59 opposes to the recess 58 under a condition that the projection 59 is interposed between the block 57 and the flange 56. As the result, a zigzag gap is made among the block 57, the projection 59 and the flange 56. The block 57, the projection 59 and the flange 56 overlap with each other in the vertical direction, as discussed, to form a labyrinth structure 60. The labyrinth structure 60 is positioned above (strictly speaking, obliquely forward upward) the intake pipe 47.

Additionally, as described above, the opening end of the intake pipe 47 has the flange 55. Accordingly, not only the block 57, the projection 59 and the flange 56 but also the entire combination of the block 57, the projection 59, the flange 56 and the flange 55 function as one labyrinth structure.

As shown in FIG. 2, a rear cushion unit 63 is disposed behind the air cleaner 34. A cross member 64 extends between the right and left seat rails 19. An upper cushion bracket 67 is affixed to the cross member 64. The upper cushion bracket 67 protrudes downward to a location below the seat rails 19. The top end of the rear cushion unit 63 is supported by the upper cushion bracket 67.

Another cross member 65 extends between the right and left rear arms 28. A lower cushion bracket 68 is affixed to the cross member 65. The lower cushion bracket 68 supports a bottom end of the rear cushion unit 63. The lower cushion bracket 68 protrudes upward to a location above the rear arms 28. Thus, the bottom end of the rear cushion unit 63 is supported by an upper portion of the associated rear arm 28 that is positioned higher than a center position thereof (center line M of the rear arm 28) in the vertical direction.

As discussed, the rear cushion unit 63 extends between the upper cushion bracket 67 and the lower cushion bracket 68. The rear cushion unit 63 slants forward so that an upper supported end 69 is positioned ahead of a lower supported end 70, and extends generally parallel to the air cleaner 34.

As shown in FIG. 2, a battery 61 is disposed behind and above the air cleaner 34, and ahead of and above the rear cushion unit 63. A fuel tank 62 is disposed behind the battery 61. The battery 61 and the fuel tank 62 are positioned under the seat 11. The fuel tank 62 is interposed between the right and left seat rails 19 to be supported by the seat rails 19.

A portion of the fuel tank 62 is positioned lower than the seat rails 19. A lower portion of the fuel tank 62 projects downward to a space 73 defined between the rear cushion unit 63 and the rear wheel 32. A front portion of the fuel tank 62 has a front slant surface 71 slanting rearward while extending downward. A rear portion of the fuel tank 62 has a rear slant surface 72 slanting forward while extending downward.

The upper supported end 69 of the rear cushion unit 63 is positioned ahead of the fuel tank 62. A bottom end of the fuel tank 62 is positioned lower than the upper supported end 69 of the rear cushion unit 63. That is, the top support end of the rear cushion unit 63 is off forward from the bottom end of the fuel tank 62, and the fuel tank 62 and the rear cushion unit 63 partially overlap with each other in a front elevational view.

A storage box 74 for storing small articles etc. is disposed under the seat 11 and behind the fuel tank 62. A top of the storage box 74 has an opening. When the seat 11 is moved to the open position, the opening is externally exposed. Thus, the articles can be putted into or out from the storage box 74 by moving the seat 11 between the open and closed positions.

As has been described, according to the motorcycle 10, cleaning of the filter element 38 or replacement thereof with new one can be easily made by removing the seat front cover 12 and taking out the lid 36 of the air cleaner 34 obliquely upward forward. That is, maintenance work of the air cleaner 34 can be made by an approach from an upper location or an obliquely front and upper location. The user thus can replace the filter element 38 with new one or can make other work without stooping or squatting down, i.e., can make the maintenance work for the air cleaner 34 in a comfortable posture of the user.

Particularly, in the motorcycle 10, because the respective meeting surfaces 37 of the lid 36 and the cleaner case 35 incline to descend forward, and the lid 36 is putted on or taken out obliquely upward forward, the seat 11 or the seat rails 19 do not disturb the attaching or detaching work of the lid 36. Thus, the attaching or detaching work of the lid 36 is easy, and the maintenance work of the air cleaner 34 can be easily made.

Because the air cleaner 34 has the box shape that is taller than is broad, the capacity of the air cleaner 34 can be made large without increasing the length of the vehicle in the fore to aft direction or the width thereof. Additionally, the maintenance work of the air cleaner 34 can be made by the approach from the upper location or the obliquely front and upper location. Thus, unlike the maintenance work made by an approach from a lateral side location, the maintenance work is not difficult even though the air cleaner 34 has the shape that is taller than is broad.

Because the air cleaner 34 is supported in the forward slanting position, the length of the air cleaner 34 in the vertical direction (apparent length in the vertical direction) when it is set is shorter than the length of the air cleaner 34 itself in the vertical direction. Thus, the seat 11 positioned above the air cleaner 34 can be placed at a relatively low position. Also, the air cleaner 34 can be efficiently positioned in the narrow space under the seat front cover 12 by making the air cleaner 34 slant forward.

According to the motorcycle 10, the air cleaner 34 is interposed between the right and left sub frames 18 and seat rails 19, and the upper portion of the air cleaner 34 protrudes upward above the seat rails 19 (see FIG. 4). As discussed, because the seat rails 19 can be placed at a relatively low position, the vehicle can be made slimmer than ever.

Particularly, in the motorcycle 10, the width of the air cleaner 34 is shorter than the distance between the right end of the seat rail 19 on the right hand side and the left end of the seat rail 19 on the left hand side. The air cleaner 34 thus does not extend out beyond the right and left seat rails 19. The vehicle is slimmer, accordingly, even though the air cleaner 34 is positioned between the right and left seat rails 19.

Also, according to the motorcycle 10, the width of the air cleaner upper portion 51 is larger than the width of the air cleaner lower portion 52. Thus, the handling of the air cleaner upper portion 51 is easier for the user. Therefore, the maintenance work of the air cleaner 34 that is made by approaching downward or obliquely downward can be more easily made.

The filter element 38 of the air cleaner 34 is positioned in the upper space of the cleaner case 35. Thus, the filter element 38 can be easily cleaned or replaced with new one by removing the lid 36, without being disturbed by the seat rails 19 etc. Also, because the filter element 38 and the seat rail 19 do not overlap with each other in the transverse direction, the distance between the right and left seat rails 19 does not need to be enlarged even though a width of the filter element 38 becomes larger. The vehicle can be made slimmer than ever, accordingly.

Further, according to the motorcycle 10, the intake pipe 47 of the air cleaner 34 is positioned in a space surrounded by the seat 11 and the forward descending portion of the seat front cover 12 (see FIG. 2). Therefore, the intake pipe 47 is sufficiently spaced apart from the front wheel 21 and the rear wheel 32. Thus, even if mud or the like is raised up by the front wheel 21 or the rear wheel 32, the mud etc. is hardly drawn into the air cleaner 34 through the intake pipe 47.

Also, the intake pipe 47 is not only positioned higher than the front wheel 21 and the rear wheel 32 but also opens obliquely upward forward. In this point of view, again drawing mud or the like through the intake pipe 47 hardly occurs.

Conventionally, the space surrounded by the seat 11 and the forward descending portion of the seat front cover 12 is the so-called dead space that is not effectively used. Particularly, the space below the hinge mechanism 53 at the front end of the seat 11 is the dead space that is not effectively used. According to the motorcycle 10, however, the dead space can be effectively used as a housing space for the intake pipe 47. Also, according to the motorcycle 10, because the seat front cover 12 is not required to be larger upward to house the intake pipe 47 therein, the space 13 in front of the seat 11 is not spoiled. Thus, drawing mud or the like into the air cleaner 34 can be effectively prevented while enjoying advantages of the frame structure of the under bone type.

The air cleaner 34 is disposed behind the engine 15, and the intake pipe 47 is positioned at the rear side of the air cleaner 34. Thus, the air cleaner 34 is interposed between the engine 15 and the intake pipe 47, and the air cleaner 34 insulates the heat from the engine 15. Hot air is inhibited from being drawn into the intake pipe 47, accordingly. Therefore, the temperature of the air supplied to the engine 15 falls, and the density of the drawn air becomes higher. The efficiency of the engine 15 increases.

Additionally, because the intake pipe 47 is directly coupled with the lid 36 of the air cleaner 34, the distance between the intake pipe 47 and the air cleaner 34 is short. Thus, the resistance of the intake air on the inlet port side in the air cleaner 34 is small.

According to the motorcycle 10, the labyrinth structure 60 is located above the intake pipe 47 (see FIG. 7). Therefore, even if drops of water fall from the seat 11 when it rains or on other occasions, the labyrinth structure 60 prevents the downward movement of the drops of water. The drops of water thus hardly enter the intake pipe 47, even though the intake pipe 47 opens obliquely upward. That is, water hardly enters the air cleaner 34 through the intake pipe 47.

As shown in FIG. 2, the space above and behind the intake pipe 47 is generally partitioned from the external space by the wall surface 75. Thus, any mud or the like can be effectively prevented from entering the intake pipe 47 from a location in the rear thereof. Additionally, the wall surface 75 may be defined by an exclusively prepared partition. Alternatively, a portion of a vehicle component may define the wall surface 75. For example, a vehicle component such as a battery, a fuel tank, a storage box or the like may be positioned behind the intake pipe 47 to define the wall surface 75 with the use of a portion of the vehicle component.

Also, according to the motorcycle 10, the rear cushion unit 63 slants relatively steeply so that the upper supported end 69 is positioned ahead of the fuel tank 62. The lower portion of the fuel tank 62 projects toward the space 73 defined between the rear cushion unit 63 and the rear wheel 32. Accordingly, the depth of the fuel tank 62 can be made larger without interfering with the fuel tank 62 and the rear cushion unit 63. Particularly, according to the motorcycle 10, the bottom end of the fuel tank 62 is positioned not higher than the upper supported end 69 of the rear cushion unit 63, and thus the fuel tank 62 becomes extremely deep.

Thus, according to the motorcycle 10, the length of the fuel tank 62 in the transverse direction or the width thereof can be smaller. Therefore, the area of the fuel tank 62 in the top plan view can be smaller, and the degree of freedom for the layout of vehicle components under the seat 11 can be improved. Additionally, in the motorcycle 10, because the length of the fuel tank 62 in the fore to aft direction becomes shorter, the storage box 74 that has a sufficient space is provided behind the fuel tank 62.

The lower supported end 70 of the rear cushion unit 63 is supported by an upper portion of the rear arm 28. Thus, the rear cushion unit 63 can extend along the locus of the pivotal movement of the rear arm 28 about the axis of the pivot shaft 31. The suspension performance of the rear cushion unit 63 can be improved, accordingly.

The rear cushion unit 63 extends generally parallel to the air cleaner 34. Therefore, the space behind the air cleaner 34 can be utilized sufficiently. As a result, the rear cushion unit 63 and the air cleaner 34 can be efficiently arranged in a limited space.

Also, according to the motorcycle 10, the battery 61 is placed in the space defined in front of the fuel tank 62 and above the rear cushion unit 63. Thus, the space under the seat 11 is effectively used, and the fuel tank 62, the rear cushion unit 63 and the battery 61 can be arranged efficiently.

The front portion of the fuel tank 62 has the front slant surface 71 that slants rearward. Thus, because the front portion of the fuel tank 62 can extend along the rear cushion unit 63, any possible interference between the fuel tank 62 and the rear cushion unit 63 can be avoided, even though the fuel tank 62 is deep enough. Also, the rear portion of the fuel tank 62 has the rear slant surface 72 that slants forward. Thus, because the rear portion of the fuel tank 62 can extend along the rear wheel 32, any possible interference between the fuel tank 62 and the rear cushion unit 63 can be avoided, even though the fuel tank 62 is deep enough.

As thus described, the present invention is useful for straddle type vehicles including motorcycles or the like.

The invention claimed is:

1. A straddle vehicle comprising:
   a vehicle body frame including a head pipe, a front frame connected to the head pipe and obliquely extending downward rearward, and a rear frame connected to the front frame and obliquely extending upward rearward, at least one of the front frame and the rear frame having a pair of spaced portions spaced apart in a transverse direction of the vehicle;
   an engine including a crankcase and a cylinder block extending forward therefrom, the engine being supported by the vehicle frame;
   an air cleaner positioned behind the cylinder block and between the spaced portions in the transverse direction;
   a seat supported by the rear frame; and
   a seat front cover that is detachably positioned below and ahead of the seat and has a concave, in a side elevational view, to define a top open space in front of the seat for covering a top of the air cleaner,
   wherein a portion or the whole of the air cleaner is mounted to be insertable and removable by an approach from an upper location or an obliquely front upper location.

2. The straddle vehicle according to claim 1, wherein the air cleaner has a box shape such that a length thereof in a vertical direction is longer than any one of a length thereof in a fore to aft direction and a length thereof in the transverse direction.

3. The straddle vehicle according to claim 2, wherein the air cleaner is supported in a forward slanting position.

4. The straddle vehicle according to any one of claims 1 to 3, wherein the air cleaner is positioned between the spaced portions of the vehicle body frame, and
   an upper portion of the cleaner projects upward more than the spaced portions.

5. The straddle vehicle according to claim 4, wherein the air cleaner includes an air cleaner upper portion positioned higher than the spaced portions of the vehicle body frame, and an air cleaner lower portion positioned lower than the spaced portions, and a width of the air cleaner upper portion is larger than a width of the air cleaner lower portion.

6. The straddle vehicle according to claim 5, wherein the width of the air cleaner upper portion is smaller than a distance between a right end of the spaced portion on a right hand side of the vehicle body frame and a left end of the spaced portion on a left hand side of the vehicle body frame.

7. The straddle vehicle according to any one of claims 1 to 3, wherein the air cleaner includes a box cleaner case a top of which opens, and a lid detachably attached to the box cleaner case to block the opening.

8. The straddle vehicle according to claim 7, wherein, meeting surfaces of the lid and the box cleaner case incline to descend forward.

9. The straddle vehicle according to claim 8, wherein the meeting surfaces of the lid and the box cleaner case extend generally parallel to the rear frame.

10. The straddle vehicle according to claim 7, wherein the air cleaner has a filter element built-in that is positioned higher than the spaced portions of the vehicle body frame.

* * * * *